(12) United States Patent
Bedingfield, Sr.

(10) Patent No.: US 8,117,036 B2
(45) Date of Patent: Feb. 14, 2012

(54) NON-DISRUPTIVE SIDE CONVERSATION INFORMATION RETRIEVAL

(75) Inventor: James Carlton Bedingfield, Sr., Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 459 days.

(21) Appl. No.: 12/327,353

(22) Filed: Dec. 3, 2008

(65) Prior Publication Data

US 2010/0138224 A1    Jun. 3, 2010

(51) Int. Cl.
*G10L 15/22* (2006.01)

(52) U.S. Cl. ............... 704/275; 704/255; 704/270.1

(58) Field of Classification Search .......... 704/270, 704/270.1, 275, 255; 379/88.01, 88.04
See application file for complete search history.

(56) References Cited

U.S. PATENT DOCUMENTS

| | | | |
|---|---|---|---|
| 6,711,543 B2 * | 3/2004 | Cameron ................. 704/270 |
| 6,937,986 B2 * | 8/2005 | Denenberg et al. ........... 704/275 |
| 7,120,234 B1 * | 10/2006 | Quinn et al. .............. 379/88.04 |
| 7,286,990 B1 * | 10/2007 | Edmonds et al. ............ 704/275 |
| 7,324,636 B2 * | 1/2008 | Sauvage et al. .......... 379/201.01 |
| 2003/0046088 A1 * | 3/2003 | Yuschik ................. 704/276 |
| 2003/0093281 A1 * | 5/2003 | Geilhufe et al. ............ 704/275 |
| 2004/0228460 A1 | 11/2004 | Keramane |
| 2006/0047518 A1 * | 3/2006 | Claudatos et al. ........... 704/275 |
| 2008/0062893 A1 | 3/2008 | Bloebaum et al. |
| 2008/0165937 A1 * | 7/2008 | Moore ................. 379/88.04 |
| 2008/0221883 A1 * | 9/2008 | Kirkland et al. ............. 704/235 |
| 2009/0132256 A1 * | 5/2009 | Geldbach et al. ............ 704/275 |
| 2009/0210232 A1 * | 8/2009 | Sanchez ................. 704/275 |

* cited by examiner

*Primary Examiner* — Martin Lerner
(74) *Attorney, Agent, or Firm* — Greenblum & Bernstein, P.L.C.

(57) ABSTRACT

Information is exchanged between a user of a communications device and an application during an ongoing conversation between the user using the communications device and a party, without disrupting the conversation. An application associated with the communications device is accessed via the communications device in response to a command and keyword spoken by the user during the communications session. Information is retrieved from the application according to the keyword spoken by the user. When the information is retrieved from the application, the user is prompted in a manner transparent to the party, after which a response is sent to the user.

16 Claims, 5 Drawing Sheets

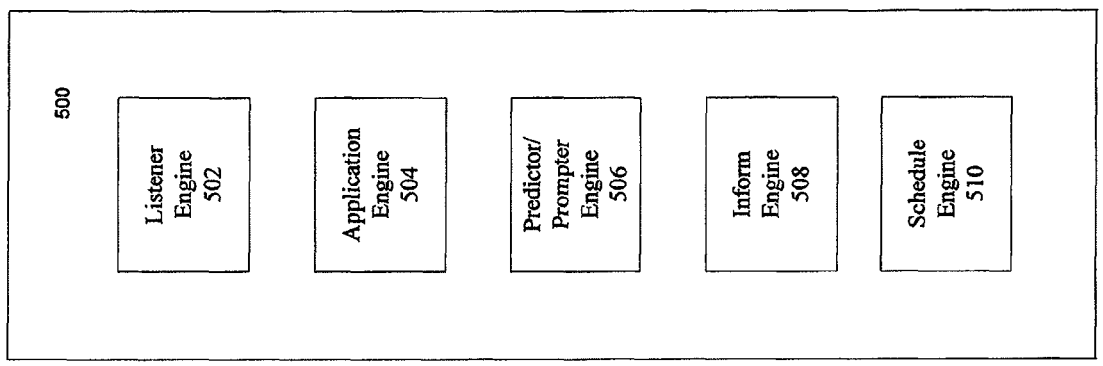

NON-DISRUPTIVE SIDE CONVERSATION INFORMATION RETRIEVAL

BACKGROUND

1. Field of the Disclosure

The present disclosure relates to communications devices. More particularly, the present disclosure relates to exchanging information between a user of a communications device and an application, without disrupting a conversation between the user of the communications device and another party.

2. Background Information

Communications devices, and portable communications devices in particular, commonly combine the functionalities of a personal digital assistant, an electronic calendar, an electronic address book, a calculator, a web browser, and an email receiver/transmitter. During the course of a communications session with a party using a portable communications device, it is frequently desired by a user to access one of the applications available to the device. For example, a user may wish to check an electronic calendar or retrieve information from an electronic address book using their communications device, in the midst of a conversation with another party via the portable communications device, while the user is driving, or is otherwise visually or physically occupied.

BRIEF DESCRIPTION OF THE DRAWINGS

FIG. 5 shows an exemplary block diagram of a system for exchanging information between a user of a communications device and an application, without disrupting a conversation between the user on the communications device and another party.

DETAILED DESCRIPTION

Figure 1:
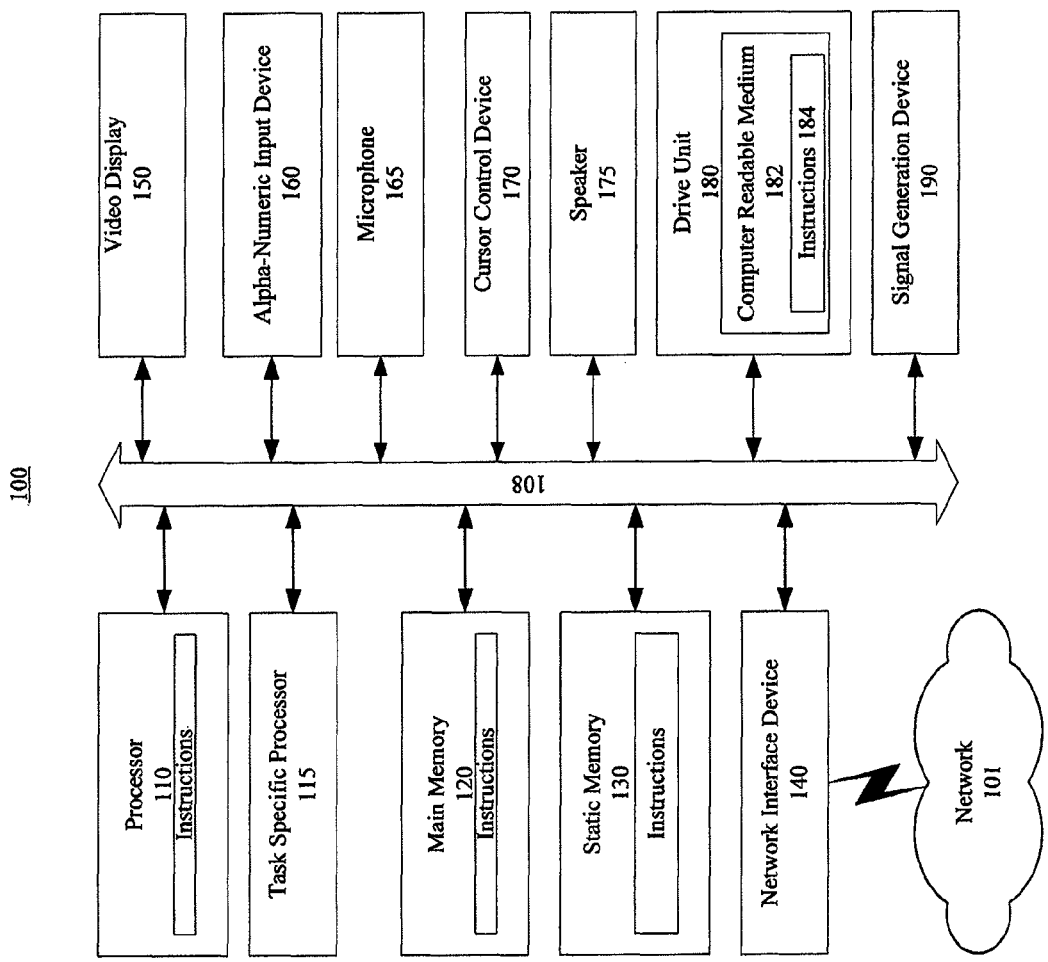
FIG. 1 shows an exemplary general computer system that includes a set of instructions for exchanging information between a user of a communications device and an application, without disrupting a conversation between the user of the communications device and another party.

In view of the foregoing, the present disclosure, through one or more of its various aspects, embodiments and/or specific features or sub-components, is thus intended to bring out one or more of the advantages as specifically noted below.

An aspect of the present invention includes a method of exchanging information between a user and an application during a conversation between the user of a communications device and a party without disrupting the conversation between the user and the party. The method includes detecting a command and a keyword spoken by the user into the communications device during the conversation, accessing the application in response to the detected command spoken by the user, retrieving information from the application in response to the keyword spoken by the user, prompting the user via the communications device, and sending a response to the communications device of the user. The prompting of the user is inaudible to the party. Additionally, a function name spoken by the user during the conversation may be detected. Thus, the application may be accessed in response to a detected function name spoken by the user.

Communications from the communications device to the party are blocked in response to the detected command spoken by the user. A communications session is established between the user and the application. Further, the user can selectively place the communications session on hold. The application can include an electronic calendar, an electronic address book, a web application, and a web browser. The prompting of the user may in fact be the response. Further, speech of the user and the party may be detected. The user may also update information in the application by an appropriate instruction. The response can include providing to the user a phone number, an email address, or information associated with a scheduled appointment. Communications from the party to the communications device of the user are blocked at the communications device of the user prior to sending the response to the communications device of the user. The response can be sent to the user when a pause is detected in the conversation between the user and the party.

According to another aspect of the present invention, a method is provided of exchanging information between a user and an application during a conversation between the user of a communications device and a party without disrupting the conversation between the user and the party. The method includes detecting speech spoken by the user and the party during the conversation, accessing the application via the communications device when a keyword is spoken by one of the user and the party, retrieving information from the application in response to the keyword spoken by the one of the user and the party, prompting the user via the communications device when the information has been retrieved, and sending a response to the communications device of the user. The application includes an electronic calendar, an electronic address book, a web application, and a web browser. The response is provided to the user in a manner inaudible to the party. The prompting of the user may in fact be the response. The communications from the party to the communications device of the user are blocked at the communications device of the user prior to sending the response to the communications device of the user.

In another aspect of the present invention, a system is provided for exchanging information between a user and an application during a conversation between a user of a communications device and a party without disrupting the conversation between the user and the party. The system includes an interface configured to detect a command and a keyword spoken during the conversation, access the application in response to the command, retrieve information associated with the keyword from the application, prompt the user via the communications device, and send a response to the communications device of the user.

FIG. 1 is an illustrative embodiment of a general computer system, on which a method to provide non-disruptive side conversation information retrieval can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices. It is noted that FIG. 1 depicts components shown in multiple embodiments of the present invention, and that not all of the components shown are utilized in all of the embodiments.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Further the computer system 100 may include a task specific processor 115, for example, an application-specific integrated circuit (ASIC), math processor, or speech processor. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The input device 160 and/or the cursor control device 170 may also include touch screen technologies using for example, a stylus, pen, finger, or other suitable article. The computer system 100 also includes a microphone 165 and a speaker 175, from which to transmit and receive audio signals, respectively. The computer system 100 can also include a disk drive unit 180, a signal generation device 190, such as a remote control, and a network interface device 140.

In a particular embodiment, as depicted in FIG. 1, the disk drive unit 180 may include a computer-readable medium 182 in which one or more sets of instructions 184, for example, software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media. Further, the main memory 120 may optionally be removable and include a secure digital (SD) card, multimedia card (MMC), universal serial bus (USB) flash drive, or a memory stick. The main memory 120 may be a solid-state drive (SSD) that uses solid-state memory to store data, or may be a rotating storage medium such as a hard disk, compact disc (CD) or digital versatile disc (DVD).

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140. The network 101 may include, for example, the public switched telephone network (PSTN), an advanced intelligent network (AIN), a personal communications service (PCS) network, the internet, an internet protocol multimedia subsystem (IMS) based communications network or other internet protocol based communications network, a satellite communications network, a broadband cable network, a local area network (LAN), a wide area network (WAN), a wireless local area network (WiLAN) also known as WiFi, a code division multiple access (CDMA) network, a time division multiple access (TDMA) network, a global system mobile (GSM) network, a virtual private network (VPN) and/or any network or combination of networks that provide a medium for transmitting and receiving communications.

Figure 2:
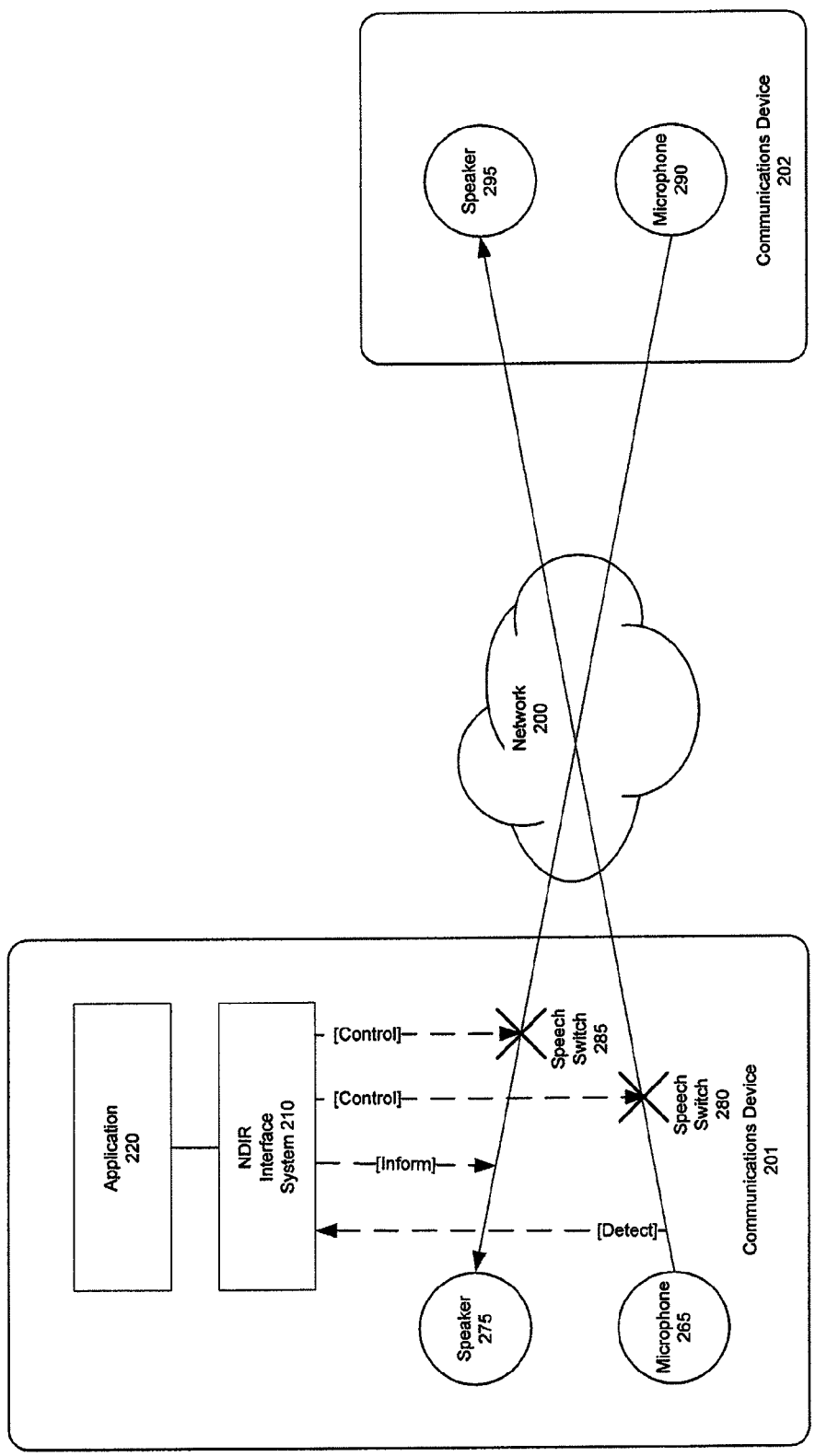
FIG. 2 shows an exemplary telecommunications network architecture, according to an aspect of the present disclosure.

FIG. 2 shows an exemplary telecommunications network architecture, according to an aspect of the present disclosure. The embodiment of FIG. 2 includes a network 200, a communications device 201, and a communications device 202. The communications device 201 includes a non-disruptive information retrieval interface system (NDIR) 210, an application 220, microphone 265, a speaker 275, and speech switches 280, 285. The communications device 202 includes a microphone 290, and a speaker 295. As used herein, the user of the communications device 201 will be referred to as the user and the user of the communications device 202 will be referred to as the party. It should be noted that the lines connecting speakers 275, 295 with microphones 290, 265, respectively, represent the communications paths provided by internal circuit paths, digital encoding circuits, radio transmission, network paths such as copper or fiber, and digital, analog, or internet protocol network switching. Such paths, well-known to those familiar with the art, are reduced here to simplify the diagrams so that the key aspects of the invention may be readily observed.

The communications devices 201, 202 may be any standalone or integrated device suitable for conducting communications sessions including, for instance, a personal computer, a tablet PC, a personal digital assistant, a mobile device, a global positioning satellite device, a palmtop computer, a laptop computer, a desktop computer, a communications device, a portable communications device, a wireless telephone, smartphone, a land-line telephone, a camera, a scanner, a pager, a personal trusted device, a portable music player, or a web appliance. During a conversation via communications device 201 and communications device 202 over the network 200, the user of communication device 201 holds the speaker 275 to the ear of the user and holds the microphone 265 to the mouth of the user. Similarly, the party of the communications device 202 holds the speaker 295 to the ear of the party and holds the microphone 290 to the mouth of the party. In other cases when the user is visually or physically occupied, speaker 275 and microphone 295 may be combined into a wired or wireless hands-free device, such as a Bluetooth device.

The communications network 200 may include, for example, the public switched telephone network, an advanced intelligent network, a personal communications service network, the internet, an internet protocol multimedia subsystem based communications network or other internet protocol based communications network, a satellite communications network, a broadband cable network, a local area network, a wide area network, a wireless local area network, a code division multiple access network, a time division multiple access network, a global system mobile network, a virtual private network and/or any network or combination of networks that provide a medium for transmitting and receiving communications. In this embodiment, the network interface device 140 shown in FIG. 1 operates as the interface to the communications network 200. That is, the interface device 140 facilitates communications over the communications network 200.

The non-disruptive information retrieval interface system 210 contains middleware that facilitates the exchange of data between the communications device 201 and the application 220. The non-disruptive information retrieval interface system 210 also includes known speech recognition and natural language processing abilities in order to recognize speech and words spoken between the user of the communications device and the party of the communications device 202. Further, the non-disruptive information retrieval interface system 210 employs known speech to text and text to speech processing algorithms and techniques in order to translate speech spoken by the user into text to be input into the application 220 and to translate text output from the application 220 into speech to be read to the user, for example, a voiceXML (VXML) interpreter. Additional aspects of the non-disruptive information retrieval interface system 210 will be discussed later in more detail.

During a conversation between the user of the communications device 201 and the party of communications device 202, the user can simultaneously access the application 220 via the communications device 201 in a manner transparent to the party using communications device 202, so that the conversation between the user and the party is not disrupted. For example, the user of communications device 201 can check an electronic personal calendar, retrieve information from an electronic address book, access a web browser, or access an Internet application, without removing the speaker 275 of the communications device 201 from the ear of the user. Thus, since the user does not have to remove speaker 275 of the communications device 201 from the ear of the user, the user may continue the conversation with the party of the communications device 202 without any disruption in the conversation. The electronic calendar includes any electronic calendar or electronic schedule program through which communications device 201 may exchange information.

In order to activate the system during a conversation with the party of the communications device 202 and access the application 220, the user of communications device 201 verbally utters a command-function-keyword sequence into the microphone 265, in a case where multiple applications are available to the user via the communications device 201. Alternatively, the user of communications device 202 utters only a command-keyword sequence into the microphone 265, in a case where only one application is available to the user via the communications device 201. That is, a function identifier need not be spoken if only one application is available on the communications device 201. For example, when the user of communications device 201 wishes to access the application 220 during a conversation with the party of communications device 202, the user utters a pre-assigned command into the microphone 265. The speech recognition and natural language processing capabilities residing on the non-disruptive information retrieval interface system 210 recognize when the user utters the pre-assigned command, as well as a function and a keyword.

The pre-assigned command is selected by the user and may be changed as desired by the user via a suitable interface using the communications device 201. For example, the user may access a menu stored on the communications device 201 and select an option to assign a pre-assigned command by recording same. Alternatively, the user may assign the pre-assigned command via keypad or other suitable input device.

Typically, the command is a word or name not common to ordinary conversation, so that a commonly used word is not mistaken for a command. In this regard, an exemplary command is "Jupiter". Alternatively, the command may be an ordinary word common to conversation, but spoken by the user using a tone and inflection not indicative of the user's normal tone and/or inflection for the particular word. For example, the command of the user may be the word "dog", but only when spoken with a deep brusque tone. In this case, the user would train the system in advance, for example, by creating a voice model based on acoustic properties associated with the voice of the user. In this regard, the non-disruptive information retrieval interface system 210 contains known functionality in order to perform acoustic analysis and create a voice model of the user, which is stored, for example, at the non-disruptive information retrieval interface system 210, or another suitable storage location. Exemplary algorithms employed to create the voice model are any of the Gaussian mixture models, the hidden Markov models, maximum entropy models, support vector machine models, machine learning algorithms, and any other current or future suitable techniques.

Assume that the party of communications device 202 wants to meet the user of communications device 201 for lunch in two days, on Friday. Since the user of the communications device 201 may not know whether lunch on Friday with the party is possible due to a possible engagement that the user has previously scheduled, the user must refer to his or her electronic personal calendar via the communications device 201. The electronic calendar is checked without removing the speaker 275 of the communications device 201 from the ear of the user, so that the conversation between the user and the party is not disrupted. Accordingly, during the conversation with the party of communications device 202, the user of the communications device 201 utters "Jupiter", which is recognized by the middleware on the non-disruptive information retrieval interface system 210 by virtue of detect circuitry, as shown in FIG. 2.

The detect circuitry shown in FIG. 2 includes, for example, a high impedance connection that permits a bridge on the communications circuits of the microphone 265 and/or the speaker 275, without deleteriously affecting the communications on the microphone 265 and/or the speaker 275. That is, by virtue of the detect circuitry, the non-disruptive information retrieval interface system 210 is able to monitor the communications spoken by the user via the microphone 265 and received via the speaker 275.

Upon recognizing the command "Jupiter", the non-disruptive information retrieval interface system 210 momentarily mutes transmissions from the microphone 265 of the communications device 201 to the speaker 295 of the communications device 202, such that the party at communications device 202 does not hear the user speak the command "Jupiter" and a subsequent function and/or keyword. This apparent "muting after the fact" is possible in a typical digital communications device, because the analog speech signal must be encoded into digital form, thus introducing a delay. Note that to block the transmission of the command itself, sufficient delay must be introduced into the speech path to allow for detection of the command before the transmission is initiated. While this delay may be minimized by, for example, combining the detection process with other functions such as digital encoding, the delay may not be acceptable to some users. If such delay is not acceptable, the implementation will allow for the command to be transmitted, but block the transmission of the subsequent function and/or key word. In this case, the command may be included by the user as part of the normal conversation, such as, "Just a minute, let me check with Jupiter," after which the speech path would be temporarily muted. Either way, the speech path can be muted to block speech transmission, as desired, using the functions depicted in FIG. 2. That is, a control circuit shown in FIG. 2 includes, for example, a relay. The relay contacts are illustrated by the "X" in FIG. 2. Voltage actuation of the relay by the control circuit causes the relay contacts at switch 280 to open, and thus momentarily mute the microphone 265 from sound going to the speaker 295 of the communications device 202, while allowing the command and a subsequent function and/or keyword to be received at the non-disruptive information retrieval interface system 210. Then, after the non-disruptive information retrieval interface system 210 receives the command and a subsequent function and/or keyword, the control circuit causes the relay contacts as switch 280 to close, thus un-muting the microphone 265 from sound originating from the microphone 265 of the communications device 201 to the speaker 295 of the communications device 202.

Once the command "Jupiter" is recognized by middleware at the non-disruptive information retrieval interface system 210, the middleware waits for a function and/or a keyword or phrase to be spoken by the user, which is spoken immediately after the command. That is, if only one application is available to the user via the communications device 201, then the user need only utter the command and a keyword. Otherwise, if multiple applications are available to the user of the communications device 201, the user must also utter the function after uttering the command, in order to identify to the middleware whether the user wishes to exchange information with, for example, the electronic calendar, electronic address book, etc. Thus, the momentary muting performed by the non-disruptive information retrieval interface system may last, for example, 0.5-2.0 seconds, or another suitable interval long enough for the user to speak the command-function-keyword sequence or command-keyword sequence.

In the present example, immediately after uttering the command, the user speaks the function "calendar", which identifies the application desired by the user, and which is recognized by the middleware on the non-disruptive information retrieval interface system 210. Upon recognizing the word "calendar", the middleware retrieves or accesses the user's locally stored electronic calendar. Then, immediately after uttering the word "calendar", the user of the communications device 201 speaks a keyword or phrase, for example, "Friday lunch". The keyword is also referred to as a schedule query. Upon recognizing the phrase "Friday lunch", the middleware checks the user's electronic calendar and determines whether the user has a scheduled event on Friday between, for example, 11:00 am and 1:30 pm. Rather than indicating a day of the week, the user may utter a date in date-month or month-date format.

An inform circuit shown in FIG. 2 is used to provide audio to the user through the speaker 275. Once the middleware determines whether or not the user is available for lunch on Friday, the middleware sends a warning signal or prompt in the form of a tone or beep to the communications device 201 to inform the user of the communications device 201 that a response to the user's schedule query is in the queue and ready to be provided to the user. The signal is sent by the middleware is heard by the user via the speaker 275. The signal serves to notify the user to create a natural pause in the conversation with the party of the communications device 202, in order to receive the response from the application 220 via the non-disruptive information retrieval interface system 210, in this case, as to whether the user is available for lunch on Friday. As a result of the signal sent by the middleware, the user creates a natural pause in the conversation, for example, by uttering a filler sound such as "um", "er", "uh", or the like. Then, when the middleware, which monitors communications via the communication device 201, detects a break in the conversation or detects one of the filler sounds, an audio response to the schedule query is sent to the communications device 201 of the user. Exemplary responses include "Friday is open", "Friday is booked", "yes", "no", or other suitable responses. The response is provided to the user, for example, in a computer generated voice or other distinctive voice, as desired by the user.

The warning signal and the response are sent to the communications device 201 so that they are heard by the user via the earpiece section of the communications device 201, but not heard by the party of the communications device 202. In most digital communications devices, a sound played to one user is not heard by the other party due to the nature of the circuitry used. However, if a communications device is subject to this sort of cross-talk, it can be prevented as follows. A control circuit shown in FIG. 2 includes, for example, a relay. The relay contacts are illustrated by the "X" in FIG. 2. Voltage actuation of the relay by the control circuit causes the relay contacts at switch 285 to open, and thus momentarily mute the speaker 275 from sound originating from the microphone 290 of the communications device 202, while allowing the user to receive the response to the schedule query via the speaker 275. Then, after the response to the schedule query is played to the user via the speaker 275, the control circuit causes the relay contacts as switch 285 to close, thus un-muting the speaker 275 from sound originating from the microphone 290 of the communications device 202.

In one alternative embodiment, the middleware does not wait for a filler sound from the user before sending the response, but uses a predictability algorithm to detect when a break in the conversation between the user and the party is likely to occur. Then, the response to the schedule query is sent to the communications device 201 based upon the predicted break in the conversation. In this embodiment, the warning signal or prompt may not be sent in advance of the response to the schedule query, in which case the schedule query response is heard by the user via the speaker 275 without the aforementioned signal. Regardless, voltage actuation of the relay by the control circuit causes the relay contacts at switch 285 to open, and thus momentarily mute the speaker 275 from sound originating from the microphone 290 of the communications device 202, while allowing the user to receive the response to the schedule query via the speaker 275. Then, after the response to the schedule query is played to the user via the speaker 275, the control circuit causes the relay contacts as switch 285 to close, thus un-muting the speaker 275 from sound originating from the microphone 290 of the communications device 202.

In a voice over embodiment, the schedule query response is sent to the communications device 201 so that it is heard by the user via the speaker 275, without muting speaker 275 from sound originating from the microphone 290 of the communications device 202. In this embodiment, the user is able to simultaneously hear the schedule query response and the party, both via the speaker 275. It has been observed that a user is capable of receiving and comprehending multiple simultaneous sources of audio sensory input. Further, the schedule query response in this embodiment may optionally play the warning signal or prompt to the user via the speaker 275. Thus, the user can receive the schedule query response via the speaker 275 without creating a natural pause in the conversation or without using the aforementioned predictability algorithm. To clearly distinguish the query schedule response from the voice of the party, the response may be voiced in a distinctive manner, such as a high pitched or a low pitched tone, or an intentionally mechanical-like or robotic voice. Further, the system may, from call to call, alter the characteristics of the response tone to improve intelligibility, based on the speech characteristics of the party as determined by analysis.

In another alternative embodiment, the tone or beep alone serves as the response to the schedule query to notify the user of the communications device 201 whether Friday is open for lunch. That is, the warning signal is the response. For example, a tone having a rising pitch is used to signify a positive response that the user is available on Friday for lunch, while a tone having a dropping pitch is used to signify a negative response that the user has a prior appointment on Friday for lunch. Of course, other types of sounds or tones may be employed, for example, a bell for a positive response and a buzz for a negative response.

Based upon the response to the schedule query received via the speaker 275 of the communications device 201, the user can book the proposed lunch appointment for Friday via a verbal instruction or request spoken into the microphone of the communications device 201. That is, the middleware receives the appointment instruction spoken by the user, and via speech to text processing at the non-disruptive information retrieval interface system, an appropriate entry is placed in the electronic calendar of application 220 of the user. Additionally, if lunch on Friday is not possible due to a previous scheduled commitment, the user can utter another day and/or time, in which case the process repeats. In an alternative embodiment, the middleware can recommend an available day or time via the same speech to text processing discussed above, in the event that the user has a prior commitment for the Friday lunch time slot, which the user can accept or decline via a suitable response.

As another example, the user may retrieve an entire day's appointments. That is, if the user utters "Jupiter calendar Friday", the middleware would access the user's calendar for Friday and retrieve all of the appointment data previously scheduled by the user for that day. Upon retrieving Friday's appointments, the middleware sends a warning signal, as discussed above, in the form of a tone or a beep to the speaker 275 of the communications device 201 to inform the user of the communications device 201 that a response to the user's query is in the queue. Then, during a pause, for example, all of the appointments scheduled for Friday on the user's electronic calendar are read to the user, for example, "10 am-11 am dentist", "2 pm-3 pm", in the manner discussed above.

Further, in one embodiment, the non-disruptive information retrieval interface system 210 includes a speech synthesizer that is configured to learn the voice of the user over time by known voice training techniques, such that the response to the schedule query heard at the speaker 275 of the communications device 201 is provided in a voice that simulates that of the user. A speech synthesizer implementing suitable hardware and/or software is provided at the non-disruptive information retrieval interface system 210 for this purpose. In this regard, XML based languages such as the speech synthesis markup language (SSML), voiceXML, Java speech markup language (JSML), and Microsoft SAPI text to speech (TTS) are exemplary.

The middleware is configured to ascertain via an internal clock that if the current day and time is Friday at 4:00 pm, then the "Friday" spoken by the user into the microphone 265 in the present example means the following Friday, as the customary lunch hour for the current Friday has passed. Of course, the middleware is configured to recognize both of the 12 hour and 24 hour time formats, as selected in advance by the user.

Optionally, the user can toggle between the application 220 and the conversation with the party at the communications device 202, via a verbal or keypad command or instruction. In this fashion, the user can put the party on hold while giving keywords or other verbal information to the application 220. That is, the user can selectively control voltage actuation of the relay by the control circuit to cause the relay contacts at switch 280 to open, and thus momentarily mute the microphone 265 from sound to the speaker 295 of the communications device 202, while allowing the user to communicate with the non-disruptive information retrieval interface system 210. Then, the user can control the control circuit to cause the relay contacts as switch 280 to close, thus un-muting the microphone 265 from sound originating from the microphone 265 of the communications device 201 to the speaker 295 of the communications device 295.

In an alternative embodiment of the present invention, the non-disruptive information retrieval interface system 210 monitors what is spoken by the user of the communications device 201 and the party of the communications device 202. As shown in FIG. 2, the detect circuitry is configured to detect speech spoken into the microphone 265 or received by the speaker 275. In this embodiment, speech recognition software at the non-disruptive information retrieval interface system 210 automatically accesses an application for the user, based upon the context of the conversation between the user and the party. For instance, a typical dialogue between the user and the party is as follows: the party says to the user "how about lunch this Friday?"; to which the user responds "let me check my calendar".

The speech recognition and natural language processing software at the non-disruptive information retrieval interface system 210 understand the words and meaning of the party's question based upon words such as "lunch" and "Friday" and understands the words and meaning of the user's response "check my calendar", which causes the middleware to retrieve or access the user's electronic calendar. Other suitable words keyed on by the middleware include "meeting", "what time", etc. Accordingly, the middleware would retrieve or access the user's personal electronic calendar and check the user's availability for lunch on Friday. A response is sent to the user via the speaker 275 in one of the manners discussed above. Optionally, when the middleware keys in on the phrase "check my calendar", or similar keyword or phrase, spoken by the user, the middleware reviews a predetermined portion of the conversation immediately preceding the phrase "check may calendar", to pick up the party's question concerning lunch on Friday. For example, a predetermined portion of conversation reviewed is twenty seconds. It is noted that the speech of the user and the party is preferably captured for processing, but is not recorded. However, in one embodiment, the non-disruptive information retrieval interface system 210 includes storage for digitally storing the conversation between the user and the party.

Figure 3:
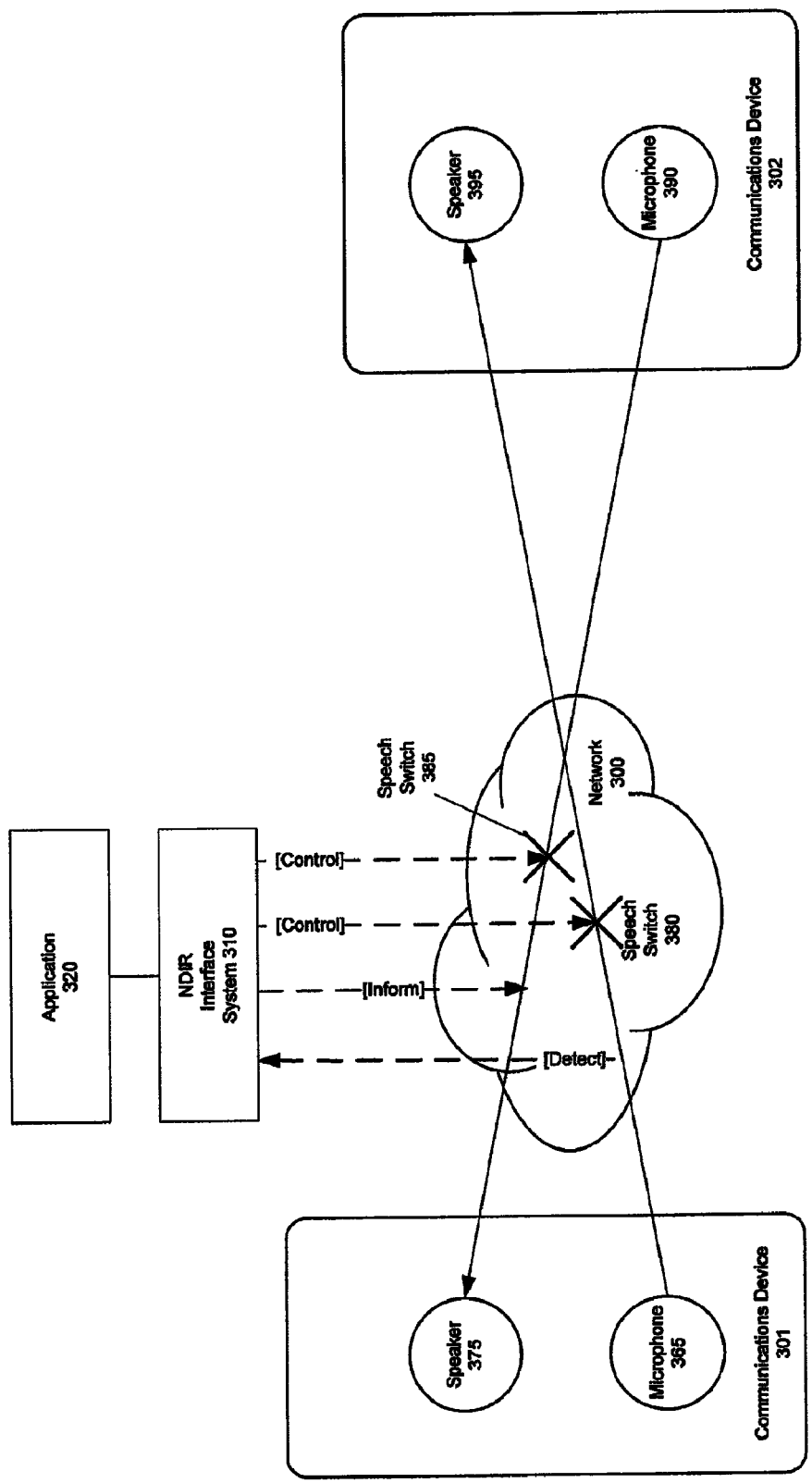
FIG. 3 shows an exemplary telecommunications network architecture, according to an aspect of the present disclosure.

FIG. 3 shows an exemplary telecommunications network architecture, according to an aspect of the present disclosure. The embodiment of FIG. 3 includes a network 300, a communications device 301, and a communications device 302. The communications device 301 includes a microphone 365 and a speaker 375. The communications device 302 includes a microphone 390 and a speaker 395. The network 300 includes a non-disruptive information retrieval interface system 310, and an application 320.

The communications devices 301, 302 may be any standalone or integrated device suitable for conducting communications session including, for instance, a personal computer, a tablet PC, a personal digital assistant, a mobile device, a global positioning satellite device, a palmtop computer, a laptop computer, a desktop computer, a communications device, a portable communications device, a wireless telephone, smartphone, a land-line telephone, a camera, a scanner, a pager, a personal trusted device, a portable music player, or a web appliance. During a conversation via communications device 301 and communications device 302 over the network 300, the user of communication device 301 holds the speaker 375 to the ear of the user and holds the microphone 365 to the mouth of the user. Similarly, the party of the communications device 302 holds the speaker 395 to the ear of the party and holds the microphone 390 to the mouth of the party.

The communications network 300 may include, for example, the public switched telephone network, an advanced intelligent network, a personal communications service network, the internet, an internet protocol multimedia subsystem based communications network or other internet protocol based communications network, a satellite communications network, a broadband cable network, a local area network, a wide area network, a wireless local area network, a code division multiple access network, a time division multiple access network, a global system mobile network, a virtual private network and/or any network or combination of networks that provide a medium for transmitting and receiving communications. In this embodiment, the network interface device 140 shown in FIG. 1 operates as the interface to the communications network 300. That is, the interface device 140 facilitates communications over the communications network 300. The network 300 includes speech switches 380, 385 that function in a manner analogous to the speech switches 280, 285 of FIG. 2. Further, the detect, inform, and control circuitry also function in manners analogous to the respective circuitry discussed with respect to FIG. 2.

FIG. 3 shows a network system with the non-disruptive information retrieval interface system 310 and the application 320 being part of network 300. The embodiment of FIG. 3 includes the features discussed above with respect to FIG. 2, except that the application 320 is network-based, rather than being local to the user's communications device. Thus, the application 320, such as a calendar or an address book, resides within, or is accessible through, the network 300 and is accessed via the communications device 301. However, the network system could be provided by a third party with call routing features apparent to those familiar with the art. In one embodiment, if the network 300 is an internet protocol multimedia subsystem (IMS) based communications network, then the non-disruptive information retrieval interface system 310 could be implemented as an application server. The lines connecting speakers 375, 395 with microphones 390, 365, respectively, represent the communications paths provided by internal circuit paths, digital encoding circuits, radio transmission, network paths such as copper or fiber, and digital, analog, or internet protocol network switching. Such paths, well-known to those familiar with the art, are reduced here to simplify the diagrams so that the key aspects of the invention may be readily observed.

Alternatively, the application 320 is accessed over the Internet by the non-disruptive information retrieval interface system 310, for example, on a home personal computer or office personal computer of the user. In this regard, accessing the application may involve traversing multiple similar or dissimilar networks, for example, of the variety discussed above. Further, it is noted that routers, hubs, and switches may be provided to facilitate the various connections in this embodiment.

The non-disruptive information retrieval interface system 310 contains middleware that facilitates the exchange of data between the communications device 301 and the application 320. The non-disruptive information retrieval interface system 310 also includes known speech recognition and natural language processing abilities in order to recognize speech and words spoken between the user of the communications device and the party of the communications device 302. Further, the non-disruptive information retrieval interface system 310 employs known speech to text and text to speech processing algorithms and techniques in order to translate speech spoken by the user into text to be input into the application 320 and to translate text output from the application 320 into speech to be read to the user, for example, a voiceXML interpreter. Additionally, exemplary speech recognition software may include Watson speech recognition software from AT&T, and exemplary audio and text to speech server may include Natural Voices from AT&T. Additional aspects of the non-disruptive information retrieval interface system 310 will be discussed later in more detail.

The non-disruptive information retrieval interface system 310 and the middleware performs the functionality of the non-disruptive information retrieval interface system 210 and middleware of the embodiment discussed above with respect to FIG. 2. Similarly, the application 320 is, for example, a personal calendar, address book, web browser, or Internet application. Accordingly, the user of the communications device 301 can access an application without interrupting a conversation with a party at communications device 302 or removing the communications device from the ear of the user. Further, as discussed above, when the user is visually or physically occupied, speaker 375 and microphone 365 may be combined into a wired or wireless hands-free device, such as a Bluetooth device.

During a conversation between the user of the communications device 301 and the party of communications device 302, the user can simultaneously access the application 320 via the communications device 301 in a manner transparent to the party using communications device 302, so that the conversation between the user and the party is not disrupted. For example, the user of communications device 301 can check an electronic personal calendar, retrieve information from an electronic address book, access a web browser, or access an Internet application, without removing the speaker 375 of the communications device 301 from the area of the user. Thus, since the user does not have to remove speaker 375 of the communications device 301 from the ear of the user, the user may continue the conversation with the party of the communications device 302 without any disruption in the conversation. The electronic calendar includes any electronic calendar or electronic schedule program through which communications device 301 may exchange information.

In order to activate the system during a conversation with the party of communications device 302 and access the application 320, the user of communications device 301 verbally utters a command-function-keyword sequence into the microphone 365, in a case where multiple applications are available to the user via the communications device 301. Alternatively, the user of communications device 302 utters a command-keyword sequence into the microphone 365, in a case where only one application is available to the user via the communications device 301. That is, a function identifier need not be spoken if only one application is available on the communications device 301. For example, when the user of communications device 301 wishes to access the application 320 during a conversation with the party of communications device 302, the user utters a pre-assigned command into the microphone 365. The speech recognition and natural language processing capabilities residing on the non-disruptive information retrieval interface system 310 recognize when the user utters the pre-assigned command, as well as a function and a keyword.

The pre-assigned command is selected by the user and may be changed as desired by the user via a suitable interface using the communications device 301. For example, the user may access a menu stored on the communications device 301 and select an option to assign a pre-assigned command by recording same. Alternatively, the user may assign the pre-assigned command via keypad or other suitable input device.

Typically, the command is a word or name not common to ordinary conversation, so that a commonly used word is not mistaken for a command. In this regard, an exemplary command is "Jupiter". Alternatively, the command may be an ordinary word common to conversation, but spoken by the user using a tone and inflection not indicative of the user's normal tone and/or inflection for the particular word. For example, the command of the user may be the word "dog", but only when spoken with a deep brusque tone. In this case, the user would train the system in advance, for example, by creating a voice model based on acoustic properties associated with the voice of the user. In this regard, the non-disruptive information retrieval interface system 310 contains known functionality in order to perform acoustic analysis and create a voice model of the user, which is stored, for example, at the non-disruptive information retrieval interface system 310, or another suitable storage location. Exemplary algorithms employed to create the voice model are any of the Gaussian mixture models, the hidden Markov models, maximum entropy models, support vector machine models, machine learning algorithms, and any other current or future suitable techniques.

Assume that the party of communications device 302 wants to meet the user of communications device 301 for lunch in two days, on Friday. Since the user of the communications device 301 may not know whether lunch on Friday with the party is possible due to a possible engagement that the user has previously scheduled, the user must refer to his or her electronic personal calendar via the communications device 301. The electronic calendar is checked without removing the speaker 375 of the communications device 301 from the ear of the user, so that the conversation between the user and the party is not disrupted. Accordingly, during the conversation with the party of communications device 302, the user of the communications device 301 utters "Jupiter", which is recognized by the middleware on the non-disruptive information retrieval interface system 310 by virtue of detect circuitry, as shown in FIG. 3.

The detect circuitry shown in FIG. 3 includes, for example, a high impedance connection that permits a bridge on the communications circuits connecting to the microphone 365 and/or the speaker 375, without deleteriously affecting the communications on the microphone 365 and/or the speaker 375. That is, by virtue of the detect circuitry, the non-disruptive information retrieval interface system 310 is able to monitor the communications spoken by the user via the microphone 365 and received via the speaker 375.

Upon recognizing the command "Jupiter", the non-disruptive information retrieval interface system 310 momentarily mutes transmissions from the microphone 365 of the communications device 301 to the speaker 395 of the communications device 302, such that the party at communications device 302 does not hear the user speak the command "Jupiter" and a subsequent function and/or keyword. This apparent "muting after the fact" is possible in a typical digital communications device, because the analog speech signal must be encoded into digital form, thus introducing a delay. Note that to block the transmission of the command itself, sufficient delay must be introduced into the speech path to allow for detection of the command before the transmission is initiated. While this delay may be minimized by, for example, combining the detection process with other functions such as digital encoding, the delay may not be acceptable to some users. If such delay is not acceptable, the implementation will allow for the command to be transmitted, but block the transmission of the subsequent function and/or key word. In this case, the command may be included by the user as part of the normal conversation, such as, "Just a minute, let me check with Jupiter," after which the speech path would be temporarily muted. Either way, the speech path can be muted to block speech transmission, as desired, using the functions depicted in FIG. 3. That is, a control circuit shown in FIG. 3 includes, for example, a relay. The relay contacts are illustrated by the "X" in FIG. 3. Voltage actuation of the relay by the control circuit causes the relay contacts at switch 380 to open, and thus momentarily mute the microphone 365 from sound going to the speaker 395 of the communications device 302, while allowing the command and a subsequent function and/or keyword to be received at the non-disruptive information retrieval interface system 310. Then, after the non-disruptive information retrieval interface system 310 receives the command and a subsequent function and/or keyword, the control circuit causes the relay contacts as switch 380 to close, thus un-muting the microphone 365 from sound originating from the microphone 365 of the communications device 301 to the speaker 395 of the communications device 395.

Once the command "Jupiter" is recognized by middleware at the non-disruptive information retrieval interface system 310, the middleware waits for a function and/or a keyword or phrase to be spoken by the user, which is spoken immediately after the command. That is, if only one application is available to the user via the communications device 301, then the user need only utter the command and a keyword. Otherwise, if multiple applications are available to the user of the communications device 301, the user must also utter the function after uttering the command, in order to identify to the middleware whether the user wishes to exchange information with, for example, the electronic calendar, electronic address book, etc. Thus, the muting performed by the non-disruptive information retrieval interface system may last, for example, 0.5-2.0 seconds, or another suitable interval long enough for the user to speak the command-function-keyword sequence or command-keyword sequence.

In the present example, immediately after uttering the command, the user speaks the function "calendar", which identifies the application desired by the user, and which is recognized by the middleware on the non-disruptive information retrieval interface system 310. Upon recognizing the word "calendar", the middleware retrieves or accesses the user's locally stored electronic calendar. Then, immediately after uttering the word "calendar", the user of the communications device 301 speaks a keyword or phrase, for example, "Friday lunch". The keyword is also referred to as a schedule query. Upon recognizing the phrase "Friday lunch", the middleware checks the user's electronic calendar and determines whether the user has a scheduled event on Friday between, for example, 11:00 am and 1:30 pm. Rather than indicating a day of the week, the user may utter a date in date-month or month-date format.

An inform circuit shown in FIG. 3 is used to provide audio to the user through the speaker 375. Once the middleware determines whether or not the user is available for lunch on Friday, the middleware sends a warning signal or prompt in the form of a tone or beep to the communications device 301 to inform the user of the communications device 301 that a response to the user's schedule query is in the queue and ready to be provided to the user. The signal is sent by the middleware is heard by the user via the speaker 375. The signal serves to notify the user to create a natural pause in the conversation with the party of the communications device 302, in order to receive the response from the application 320 via the non-disruptive information retrieval interface system 310, in this case, as to whether the user is available for lunch on Friday. As a result of the signal sent by the middleware, the user creates a natural pause in the conversation, for example, by uttering a filler sound such as "um", "er", "uh", or the like. Then, when the middleware, which monitors communications via the communication device 301, detects a break in the conversation or detects one of the filler sounds, an audio response to the schedule query is sent to the communications device 301 of the user. Exemplary responses include "Friday is open", "Friday is booked", "yes", "no", or other suitable responses. The response is provided to the user, for example, in a computer generated voice or other distinctive voice, as desired by the user.

The warning signal and the response are sent to the communications device 301 so that it they are heard by the user via the earpiece section of the communications device 301, but not heard by the party of the communications device 302. In most digital communications devices, a sound played to one user is not heard by the other party due to the nature of the circuitry used. However, if a communications device is subject to this sort of cross-talk, it can be prevented as follows. That is, a control circuit shown in FIG. 3 includes, for example, a relay. The relay contacts are illustrated by the "X" in FIG. 3. Voltage actuation of the relay by the control circuit causes the relay contacts at switch 385 to open, and thus momentarily mute the speaker 375 from sound originating from the microphone 390 of the communications device 302, while allowing the user to receive the response to the schedule query via the speaker 375. Then, after the response to the schedule query is played to the user via the speaker 375, the control circuit causes the relay contacts as switch 385 to close, thus un-muting the speaker 375 from sound originating from the microphone 390 of the communications device 302.

In one alternative embodiment, the middleware does not wait for a filler sound from the user before sending the response, but uses a predictability algorithm to detect when a break in the conversation between the user and the party is likely to occur. Then, the response to the schedule query is sent to the communications device 301 based upon the predicted break in the conversation. In this embodiment, the warning signal or prompt may not be sent in advance of the response to the schedule query, in which case the schedule query response is heard by the user via the speaker 375 without the aforementioned signal. Regardless, voltage actuation of the relay by the control circuit causes the relay contacts at switch 385 to open, and thus momentarily mute the speaker 375 from sound originating from the microphone 390 of the communications device 302, while allowing the user to receive the response to the schedule query via the speaker 375. Then, after the response to the schedule query is played to the user via the speaker 375, the control circuit causes the relay contacts as switch 385 to close, thus un-muting the speaker 375 from sound originating from the microphone 390 of the communications device 302.

In a voice over embodiment, the schedule query response is sent to the communications device 301 so that it is heard by the user via the speaker 375, without muting speaker 375 from sound originating from the microphone 390 of the communications device 302. In this embodiment, the user is able to simultaneously hear the schedule query response and the party, both via the speaker 375. It has been observed that a user is capable of receiving and comprehending multiple simultaneous sources of audio sensory input. Further, the schedule query response in this embodiment may optionally play the warning signal or prompt to the user via the speaker 375. Thus, the user can receive the schedule query response via the speaker 375 without creating a natural pause in the conversation or without using the aforementioned predictability algorithm. To clearly distinguish the query schedule response from the voice of the party, the response may be voiced in a distinctive manner, such as a high pitched or a low pitched tone, or an intentionally mechanical-like or robotic voice. Further, the system may, from call to call, alter the characteristics of the response tone to improve intelligibility, based on the speech characteristics of the party as determined by analysis.

In another alternative embodiment, the tone or beep alone serves as the response to the schedule query to notify the user of the communications device 301 whether Friday is open for lunch. That is, the warning signal is the response. For example, a tone having a rising pitch is used to signify a positive response that the user is available on Friday for lunch, while a tone having a dropping pitch is used to signify a negative response that the user has a prior appointment on Friday for lunch. Of course, other types of sounds or tones may be employed, for example, a bell for a positive response and a buzz for a negative response.

Based upon the response to the schedule query received via the speaker 375 of the communications device 301, the user can book the proposed lunch appointment for Friday via a verbal instruction or request spoken into the microphone of the communications device 301. That is, the middleware receives the appointment instruction spoken by the user, and via speech to text processing at the non-disruptive information retrieval interface system, an appropriate entry is placed in the electronic calendar of application 320 of the user.

Additionally, if lunch on Friday is not possible due to a previous scheduled commitment, the user can utter another day and/or time, in which case the process repeats. In an alternative embodiment, the middleware can recommend an available day or time via the same speech to text processing discussed above, in the event that the user has a prior commitment for the Friday lunch time slot, which the user can accept or decline via a suitable response.

As another example, the user may retrieve an entire day's appointments. That is, if the user utters "Jupiter calendar Friday", the middleware would access the user's calendar for Friday and retrieve all of the appointment data previously scheduled by the user for that day. Upon retrieving Friday's appointments, the middleware sends a warning signal, as discussed above, in the form of a tone or a beep to the speaker 375 of the communications device 301 to inform the user of the communications device 301 that a response to the user's query is in the queue. Then, during a pause, for example, all of the appointments scheduled for Friday on the user's electronic calendar are read to the user, for example, "10 am-11 am dentist", "2 pm-3 pm", in the manner discussed above.

Further, in one embodiment, the non-disruptive information retrieval interface system 310 includes a speech synthesizer that is configured to learn the voice of the user over time by known voice training techniques, such that the response to the schedule query heard at the speaker 375 of the communications device 301 is provided in a voice that simulates that of the user. A speech synthesizer implementing suitable hardware and/or software is provided at the non-disruptive information retrieval interface system 310 for this purpose. In this regard, XML based languages such as the speech synthesis markup language, voiceXML, Java speech markup language, and Microsoft SAPI text to speech are exemplary.

The middleware is configured to ascertain via an internal clock that if the current day and time is Friday at 4:00 pm, then the "Friday" spoken by the user into the microphone 365 in the present example means the following Friday, as the customary lunch hour for the current Friday has passed. Of course, the middleware is configured to recognize both of the 12 hour and 24 hour time formats, as selected in advance by the user.

Optionally, the user can toggle between the application 320 and the conversation with the party at the communications device 302, via a verbal or keypad command or instruction. In this fashion, the user can put the party on hold while giving keywords or other verbal information to the application 320. That is, the user can selectively control voltage actuation of the relay by the control circuit to cause the relay contacts at switch 380 to open, and thus momentarily mute the microphone 365 from sound to the speaker 395 of the communications device 302, while allowing the user to communicate with the non-disruptive information retrieval interface system 310. Then, the user can control the control circuit to cause the relay contacts as switch 380 to close, thus un-muting the microphone 365 from sound originating from the microphone 365 of the communications device 301 to the speaker 395 of the communications device 302.

In an alternative embodiment of the present invention, the non-disruptive information retrieval interface system 310 monitors what is spoken by the user of the communications device 301 and the party of the communications device 302. As shown in FIG. 3, the detect circuitry is configured to detect speech spoken into the microphone 365 or received by the speaker 375. In this embodiment, speech recognition software at the non-disruptive information retrieval interface system 310 automatically accesses an application for the user, based upon the context of the conversation between the user and the party. For instance, a typical dialogue between the user and the party is as follows: the party says to the user "how about lunch this Friday?"; to which the user responds "let me check my calendar".

The speech recognition and natural language processing software at the non-disruptive information retrieval interface system 310 understand the words and meaning of the party's question based upon words such as "lunch" and "Friday" and understands the words and meaning of the user's response "check my calendar", which causes the middleware to retrieve or access the user's electronic calendar. Other suitable words keyed on by the middleware include "meeting", "what time", etc. Accordingly, the middleware would retrieve or access the user's personal electronic calendar and check the user's availability for lunch on Friday. A response is sent to the user via the speaker 375 in one of the manners discussed above. Optionally, when the middleware keys in on the phrase "check my calendar", or similar keyword or phrase, spoken by the user, the middleware reviews a predetermined portion of the conversation immediately preceding the phrase "check may calendar", to pick up the party's question concerning lunch on Friday. For example, a predetermined portion of conversation reviewed is twenty seconds. It is noted that the speech of the user and the party is preferably captured for processing, but is not recorded. However, in one embodiment, the non-disruptive information retrieval interface system 310 includes a storage for digitally storing the conversation between the user and the party.

Figure 4:
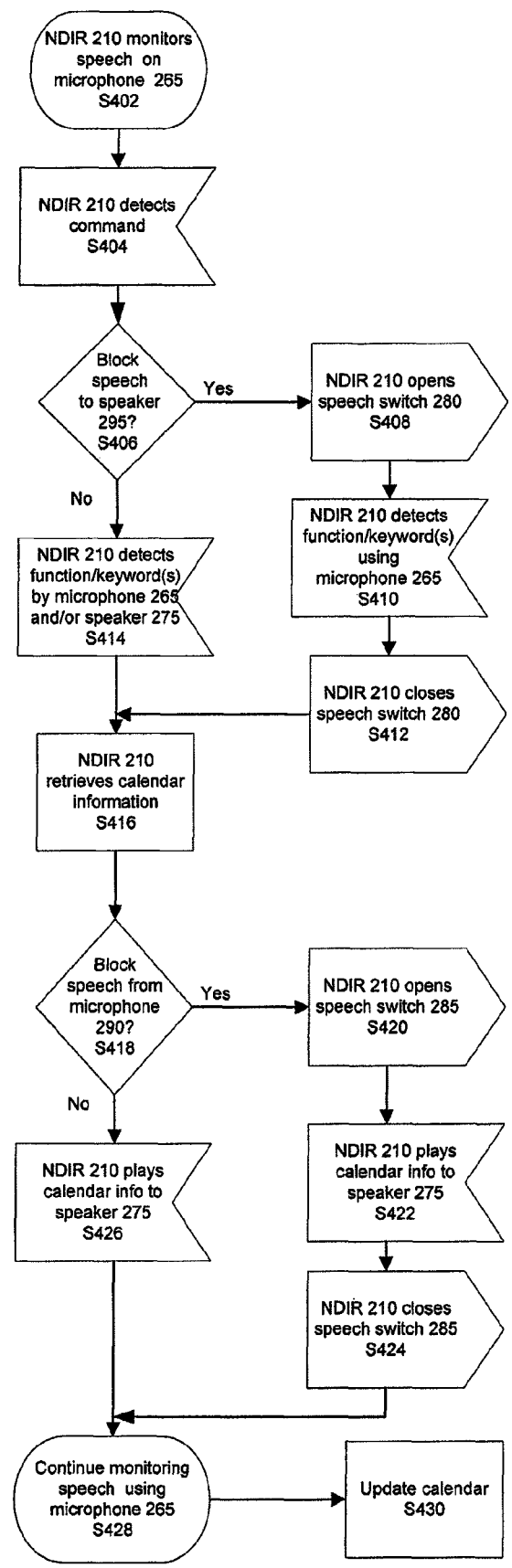
FIG. 4 shows an exemplary flow diagram for exchanging information between a user of a communications device and an application, without disrupting a conversation between the user on the communications device and another party.

FIG. 4 shows an exemplary flow diagram for exchanging information between a user of a communications device and an application, without disrupting a conversation between the user on the communications device and another party. The following discussion applies to both of the embodiments of FIGS. 2 and 3; however, the reference numerals referred to in the following discussion are from FIG. 2.

At step S402, the non-disruptive information retrieval interface system 210 monitors the communications spoken by the user via the microphone 265. The non-disruptive information retrieval interface system 210 can also monitor communications received via the speaker 275. The high impedance connection discussed above permits a bridge on the communications circuits of the microphone 265 and/or the speaker 275, without adversely affecting the communications on the microphone 265 and/or the speaker 275.

At step S404, the detect circuitry of the non-disruptive information retrieval interface system 210 detects that the user engaged in a conversation with a party has uttered the command "Jupiter" into speaker 265. In one embodiment (step S406=YES), upon recognizing the command "Jupiter", the non-disruptive information retrieval interface system 210 mutes or blocks transmissions from the microphone 265 of the communications device 201 to the speaker 295 of the communications device 202, such that the party at communications device 202 does not hear the user speak the command "Jupiter" and a subsequent function and/or keyword. As discussed, this apparent "muting after the fact" is possible in a typical digital communications device, because the analog speech signal must be encoded into digital form, thus introducing a delay. Note that to block the transmission of the command itself, sufficient delay must be introduced into the speech path to allow for detection of the command before the transmission is initiated. While this delay may be minimized by, for example, combining the detection process with other functions such as digital encoding, the delay may not be acceptable to some users. If such delay is not acceptable, the implementation will allow for the command to be transmitted, but block the transmission of the subsequent function and/or key word. In this case, the command may be included by the user as part of the normal conversation, such as, "Just a minute, let me check with Jupiter," after which the speech path would be temporarily muted. Either way, the speech path can be muted to block speech transmission, as desired.

With respect to the previously discussed control circuit, voltage actuation of the relay by the control circuit causes the relay contacts at speech switch (SS) 280 to open at step S408. Then, at step S410, the non-disruptive information retrieval interface system 210 detects a function and/or keyword spoken by the user into microphone 265. After the detection of the function and/or keyword by the non-disruptive information retrieval interface system 210, the control circuit causes the relay contacts at speech switch 280 to close at step S412, thus un-muting the microphone 265 from sound originating from the microphone 265 of the communications device 201 to the speaker 295 of the communications device 202.

In an alternative embodiment (step S406=NO), if the non-disruptive information retrieval interface system 210 does not mute transmissions from the microphone 265 of the communications device 201 to the speaker 295 of the communications device 202 in response to recognizing the command "Jupiter", the non-disruptive information retrieval interface system 210 detects a function and/or keyword spoken by the user into microphone 265 and/or by the party at speaker 275 at step S414.

At step S416, the non-disruptive information retrieval interface system 210 retrieves calendar information responsive to the schedule query of the user. For example, when recognizing the phrase "Friday lunch", the non-disruptive information retrieval system 210 checks the user's personal calendar and determines whether the user has an opening during lunchtime on Friday. Once the non-disruptive information retrieval system 210 determines a response to the schedule query of the user, the middleware sends a signal or prompt in the form of a tone or beep to the communications device 201 to inform the user of the communications device 201 that a response to the user's schedule query is in the queue and ready to be provided to the user. The signal, also known as a warning signal, is sent by the middleware is heard by the user via the speaker 275.

In one embodiment (step S418=YES), the response from the non-disruptive information retrieval system 210 is sent to the user via the speaker 275 of the communications device 201 in a manner transparent to the party at communications device 202. That is, at step S420, voltage actuation of the relay by the control circuit causes the relay contacts at speech switch 285 to open, and thus momentarily mute the speaker 275 from sound originating from the microphone 290 of the communications device 202, while allowing the user to receive the response to the schedule query via the speaker 275. Then, at step S422, the non-disruptive information retrieval system 210 plays the response to the user via the speaker 275 of the communications device 201. After the response is played to the user, the control circuit causes the relay contacts as speech switch 285 to close, thus un-muting the speaker 275 from sound originating from the microphone 290 of the communications device 202 at step S424.

In an alternative embodiment (step s418=NO), the non-disruptive information retrieval system 210 does not perform the muting and un-muting at steps S420 and S424, respectively. In this case, the non-disruptive information retrieval system 210 plays the response to the user via the speaker 275 of the communications device 201 at step S426. At step S428, the non-disruptive information retrieval interface system 210 continues monitoring the communications spoken by the user via the microphone 265 and received via the speaker 275.

At step S430, the user provides a verbal or other suitable input command via the non-disruptive information retrieval interface system 210 to the application to add an appointment to the calendar. That is, if the user is available for lunch on Friday, then the user can update his or her calendar by scheduling the appointment with the party. If this updating is done by verbal command, it may be done by muting transmissions from the microphone 265 of the communications device 201 to the speaker 295 of the communications device 202, such that the party at communications device 202 does not hear the user updating the calendar. In this case, the muting is accomplished via the speech switch 280 in the manner discussed above.

A discussed above, in one embodiment, the middleware does not wait for a filler sound before sending the response, but uses a predictability algorithm to detect when a break in the conversation between the user and the party is likely to occur. Then, the response is sent to the communications device 201 based upon the predicted break in the conversation. In another alternative embodiment, the warning signal serves as the response, such that a tone with a rising pitch signifies that the calendar is open for the proposed time and a tone with a dropping pitch signifies that the calendar is already booked for the proposed time.

FIG. 5 shows an exemplary block diagram of a system for exchanging information between a user of a communications device and an application, without disrupting a conversation between the user on the communications device and another party. It should be noted that the system shown in FIG. 5 is the non-disruptive information retrieval interface system 210, 310 shown in FIGS. 2 and 3, respectively. The system includes a listener engine 502, an application engine 504, a predictor/prompter engine 506, an inform engine 508, and a schedule engine 510, each of which remains under control of the middleware at the non-disruptive information retrieval interface system.

The listener engine 502 listens for commands, functions, and keywords spoken by the user of the communications device during the conversation between the user and the party. The listener engine includes the detect circuitry discussed above with respect to FIGS. 2 and 3. Additionally, the listener engine includes a speech to text converter for converting speech spoken by the user and/or party into text. After capturing the user's spoken command and function, the middleware passes the keyword to the application engine 504, which accesses the appropriate application, for example, personal calendar, address book etc. The application engine checks whether the user is available for lunch on Friday by reviewing for any entries on the user's calendar for Friday between, for example, 11:30 am and 1:30 pm. If the user has an entry on Friday between the noted times, then the application engine determines that the user has a conflict. On the other hand, if no entry exists on Friday between the noted times, then the application determines that the use has no scheduled commitment for lunch on Friday. After the application engine 504 makes a determination as to whether the user has a prior commitment for Friday at lunch, the middleware passes control to the predictor/prompter engine 506.

The predictor/prompter engine 506 sends a warning signal in the form of a tone or beep to the communications device 201 to inform the user of the communications device 201 to create a natural pause in the conversation with the party of the communications device 202, in order to receive the response from the application as to whether the user is available for lunch on Friday. The predictor/prompter engine includes the inform circuitry as discussed above with respect to FIGS. 2 and 3. As a result, the user creates a natural break in the conversation, for example, by uttering a filler sound such as "um", "er", "uh", or the like. Then, when the predictor/prompter engine 506 detects a break in the conversation or one of the filler sounds, a response is sent by the inform engine 508 to the communications device 201 of the user. Exemplary responses include "Friday is open", "Friday is booked", "yes", "no", or other suitable responses. The response is sent to the communications device 201 so that it is heard by the user via the earpiece section of the communications device 201, but is not heard by the party of the communications device 202. Alternatively, immediately prior to sending the response to the schedule query to the communications device 201, the non-disruptive information retrieval interface system 210 momentarily mutes transmissions from the communications device 201 such that the party at communications device 202 does not hear the response. That is, only the user hears the response to the schedule query, via the communications device 201.

In one alternative embodiment, the middleware does not wait for a filler sound before sending the response, but uses a predictability algorithm to detect when a break in the conversation between the user and the party is likely to occur. Then, the response is sent by the inform engine 508, which includes a text to speech converter, to the communications device 201 based upon the predicted break in the conversation. In another alternative embodiment, a tone with a rising pitch signifies that the calendar is open for the proposed time and a tone with a dropping pitch signifies that the calendar is already booked for the proposed time.

The schedule engine 510 books the appointment in response to an instruction by the user of the communications device 201. For example, if the inform engine 508 notifies the user that is available for lunch on Friday, and the user responds with a verbal or keypad instruction to add the Friday lunch date to the user's calendar, the schedule engine adds the entry to the user's personal calendar. This process is achieved through a speech to text conversion process at the non-disruptive information retrieval interface system. It should be understood that the system of FIG. 5 applies to the embodiments of FIGS. 2 and 3, and the use of the reference numerals from FIG. 2 is not intended to be limiting.

Accordingly, the present invention enables a user engaged in a communications session with a party to access an applications program such as a calendar, address book, or Internet application, without disrupting the communications session.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the application 220 may be an electronic address book rather than a personal calendar. In this case, the user of the communications device 201, in the midst of a conversation with a party of the communications device 202, speaks "Jupiter number Dr. Jones", in order to retrieve a telephone number or other contact information associated with Dr. Jones, such as a residential address, work address, email address. Further, the electronic address book may be local to the communications device as discussed above with respect to FIG. 2, or may be network based as discussed above with respect to FIG. 3. The requested information is obtained via the non-disruptive information retrieval interface system and middleware in the manner discussed above. Once the desired information is retrieved from the electronic address book, the information is read to the user. For example, the text to speech application converts the text obtained from the electronic address book into speech in order to read "404-555-1212" to the user of the communications device 201. Of course, as discussed previously, a prompt may be sent to the user, thus signaling the user to create a pause in the conversation, at which time the number is read to the user. Alternatively, in the voice over embodiment, the response is sent to the communications device 201 while the user, or the party, is still speaking. Thus, the user can receive the response without creating a natural pause in the conversation, or without using a predictability algorithm.

In one alternative embodiment, the non-disruptive information retrieval interface system 210 monitors what is spoken by the user of the communications device 201 and the party of the communications device 202. In this embodiment, speech recognition software at the non-disruptive information retrieval interface system 210 automatically accesses an application based upon the context of the conversation between the user and the party. For instance, the speech recognition and natural language processing software at the non-disruptive information retrieval interface system 210 understand the words and meaning of the user's questions such as "what is your number" or "give me your number". Similarly, the speech recognition and natural language processing software at the non-disruptive information retrieval interface system 210 understands the words and meaning of the party's speech such as "my number is 555-555-5555" or "here is my number 555-555-5555". Of course these possibilities are merely exemplary and equivalent questions and phrases are considered as well. Once the speech recognition and natural language processing software understand that the party is providing a telephone number to the user, the non-disruptive information retrieval interface system converts the speech to text and automatically accesses the user's electronic address book where the phone number provided by the party is stored. This feature is not limited to a phone number, but may also include an address, an email address, or an Internet address.

The application 220 may also be an Internet application, for example a web browser. For example, the user of the communications device 201, in the midst of a conversation with a party of the communications device 202, can utter "Jupiter browser Braves score", in order to retrieve the final or in progress score of an Atlanta Braves game. In response to the phrase uttered by the user, the middleware converts the user's speech into text and enters the converted text into a suitable search engine or accesses an appropriate website to retrieve the game score. For example, in one embodiment, the user preprograms a list of preferred websites in which the middleware accesses to retrieve the desired information through a web browser associated with the personal communications device 201. The requested information is obtained via the non-disruptive information retrieval interface system and middleware in the manner discussed above. Once the score of the Braves game is retrieved, the text to speech application converts the text of the score to speech in order to read "Braves 3 Giants 1" to the user of the communications device 201, at an appropriate pause in the conversation between the user and the party. Of course, as discussed previously, a prompt may be sent to the user, thus signaling the user to create a pause in the conversation, at which time the score is read to the user.

The present invention is not limited to obtaining calendar information, address book information, and game scores, during a conversation using a communications device. That is, other contemplated uses include obtaining stock quotes, obtaining weather reports, obtaining traffic information, performing calculator functions, and the like.

It should be understood that all of the aforementioned features discussed herein are applicable to both the local and network-based embodiments of the present invention.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmission (TCP/IP) and speech synthesis (VXML, JSML, TTS, SSML) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of exchanging information between a user and an application during a conversation between the user of a communications device and a party without disrupting the conversation between the user and the party, comprising:
    detecting a command and a keyword spoken by the user into the communications device during the conversation;
    accessing the application in response to the detected command spoken by the user;
    retrieving information from the application in response to the keyword spoken by the user;
    prompting the user by sending a warning signal in the form of a tone to the communications device, the warning signal serving to notify the user to create a natural pause in the conversation by uttering a filler sound so that a response may be sent to the user, the response based on the information retrieved from the application;
    monitoring the conversation between the user and the party;
    detecting the filler sound uttered by the user in response to the warning signal; and
    sending the response to the communications device of the user in response to the detection of the filler sound uttered by the user.

2. The method according to claim 1, wherein the warning signal is inaudible to the party.

3. The method according to claim 1, further comprising detecting a function name spoken by the user during the conversation.

4. The method according to claim 3, further comprising accessing the application in response to the detected function name spoken by the user.

5. The method according to claim 1, wherein communications from the communications device to the party are blocked in response to the detected command spoken by the user.

6. The method according to claim 1, wherein a communications session is established between the user and the application.

7. The method according to claim 1, wherein the application comprises at least one of an electronic calendar, an electronic address book, a web application, and a web browser.

8. The method according to claim 1, further comprising detecting speech of the user and the party.

9. The method according to claim 1, further comprising updating information in the application in response to an instruction from the user.

10. The method according to claim 1, wherein the response comprises providing at least one of a phone number, an email address, and information associated with a scheduled appointment to the user.

11. The method according to claim 1, wherein communications from the party to the communications device of the user are blocked at the communications device of the user prior to sending the response to the communications device of the user.

12. A method of exchanging information between a user and an application during a conversation between the user of a communications device and a party without disrupting the conversation between the user and the party, comprising:
   detecting speech spoken by the user and the party during the conversation;
   accessing the application via the communications device when a keyword is spoken by one of the user and the party;
   retrieving information from the application in response to the keyword spoken by the one of the user and the party;
   prompting the user by sending a warning signal in the form of a tone to the communications device when the information has been retrieved, the warning signal serving to notify the user to create a natural pause in the conversation by uttering a filler sound so that a response may be sent to the user, the response based on the information retrieved from the application;
   monitoring the conversation between the user and the party;
   detecting the filler sound uttered by the user in response to the warning signal; and
   sending the response to the communications device of the user in response to the detection of the filler sound uttered by the user.

13. The method according to claim 12, wherein the application comprises at least one of an electronic calendar, an electronic address book, a web application, and a web browser.

14. The method according to claim 12, further comprising providing the response to the user in a manner inaudible to the party.

15. The method according to claim 12, wherein communications from the party to the communications device of the user are blocked at the communications device of the user prior to sending the response to the communications device of the user.

16. A system for exchanging information between a user and an application during a conversation between a user of a communications device and a party without disrupting the conversation between the user and the party, comprising an interface configured to detect a command and a keyword spoken during the conversation, access the application in response to the command, retrieve information associated with the keyword from the application, prompt the user by sending a warning signal in the form of a tone to the communications device, the warning signal serving to notify the user to create a natural pause in the conversation by uttering a filler sound so that a response may be sent to the user, the response based on the information retrieved from the application, monitor the conversation between the user and the party, detect the filler sound uttered by the user in response to the warning signal, and send the response to the communications device of the user in response to the detection of the filler sound uttered by the user.

* * * * *